(12) United States Patent
Shen et al.

(10) Patent No.: US 8,376,800 B2
(45) Date of Patent: Feb. 19, 2013

(54) POOL FLOAT

(75) Inventors: Aifu Shen, Ningbo (CN); Scott Burke, Oceanside, CA (US)

(73) Assignee: Keeper Sports Products, LLC, Oceanside, CA (US)

( * ) Notice: Subject to any disclaimer, the term of this patent is extended or adjusted under 35 U.S.C. 154(b) by 155 days.

(21) Appl. No.: 12/847,614

(22) Filed: Jul. 30, 2010

(65) Prior Publication Data

US 2011/0159756 A1  Jun. 30, 2011

(30) Foreign Application Priority Data

Dec. 31, 2009  (CN) .......................... 2009 1 0215884

(51) Int. Cl.
  *B63C 9/08*  (2006.01)
(52) U.S. Cl. ........................................ 441/129
(58) Field of Classification Search ............ 441/129; 114/357
  See application file for complete search history.

(56) References Cited

U.S. PATENT DOCUMENTS

| | | | | | |
|---|---|---|---|---|---|
| 2,748,401 | A | * | 6/1956 | Winstead | 5/655.3 |
| 3,380,088 | A | * | 4/1968 | D Adesky | 5/420 |
| 4,239,796 | A | * | 12/1980 | Shanoski et al. | 428/319.7 |
| 4,634,393 | A | * | 1/1987 | Wood | 441/129 |
| 4,723,329 | A | * | 2/1988 | Vaccaro | 5/710 |
| 4,824,411 | A | * | 4/1989 | McClanahan | 441/129 |
| 2005/0029697 | A1 | * | 2/2005 | Wu et al. | 264/51 |
| 2008/0081526 | A1 | * | 4/2008 | Hagedorn | 441/129 |

OTHER PUBLICATIONS

Good Life Designs, Aqua Lounger Pool Float, Sep. 14, 009.
Sport Dimension & Stallion Sports, Pool Float, Dec. 29, 2009.
Summer Breeze Pool Float, Sep. 4, 2009.
TRC Recreation LP, Sunsation Pool Float, Sep. 4, 2009.

* cited by examiner

*Primary Examiner* — Stephen Avila
(74) *Attorney, Agent, or Firm* — Perkins Coie LLP

(57) ABSTRACT

A floating bed includes a body having four edges, including an upper edge, a lower edge, and two side edges. The body is optionally made from foam materials or foam rubber materials, such as polyethylene (PE) or ethylene vinyl acetate (EVA). The body has first and second surfaces that include a plurality of transverse concave and convex ridges that are optionally evenly distributed. Each concave ridge on the first surface optionally corresponds to a convex ridge on the second surface, and each convex ridge on the first surface optionally corresponds to a concave ridge on the second surface.

13 Claims, 5 Drawing Sheets

POOL FLOAT

PRIORITY CLAIM

This application claims priority to Chinese Patent Application No. 200910215884.1, filed Dec. 31, 2009, now pending, which is incorporated herein by reference.

BACKGROUND

There are generally two kinds of floating beds that may be used in a pool. The first has a polyvinyl chloride (PVC) core, and is covered by plastic film that is applied by a dipping process. PVC-based floating beds are generally complicated to make, have a low yield, and the materials are expensive. In addition, PVC has been restricted in many countries because it is toxic to the environment and is often made more flexible and resilient by adding plasticizers such as phthalates that have been linked to many health concerns in humans. The other common type of floating bed is inflatable, forming an air mattress that floats on the water. However, inflatable floating beds are generally not durable and are easily damaged or punctured.

SUMMARY

A floating bed includes a body having four edges, including an upper edge, a lower edge, and two side edges. The body is optionally made from foam materials or foam rubber materials, such as polyethylene (PE) or ethylene vinyl acetate (EVA). The body has first and second surfaces that include a plurality of transverse concave and convex ridges that are optionally evenly distributed. Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION OF THE DRAWINGS

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Turning now in detail to the drawings, as shown in FIGS. 1-4, a floating bed 100, according to one embodiment, includes a body 3 preferably made from one or more closed cell foam or foam rubber materials. In some embodiments, a single piece of foam material or foam rubber material is used. Examples of closed cell foams or foam rubber materials may include, but are not limited to, polyethylene (PE) and ethylene vinyl acetate (EVA). Such materials are generally lightweight, have excellent memory characteristics (i.e., they will regain their original shape after being compressed), are thermal insulators, and provide many other physical advantages, including: durability, permanent buoyancy, water resistance, and flexibility. These advantages provide a comfortable, portable floating bed and allow such a bed to (i) stay relatively cool in the sun, (ii) not stick to the skin of a user, (iii) form to the user's body, and (iv) move with the ripples of the water when in use. Further, PE and EVA are generally harmless to humans, resistant to chlorine, salt water, mildew, mold, rot, and bacteria growth, and are environmentally friendly and free from phthalates.

Figure 1:
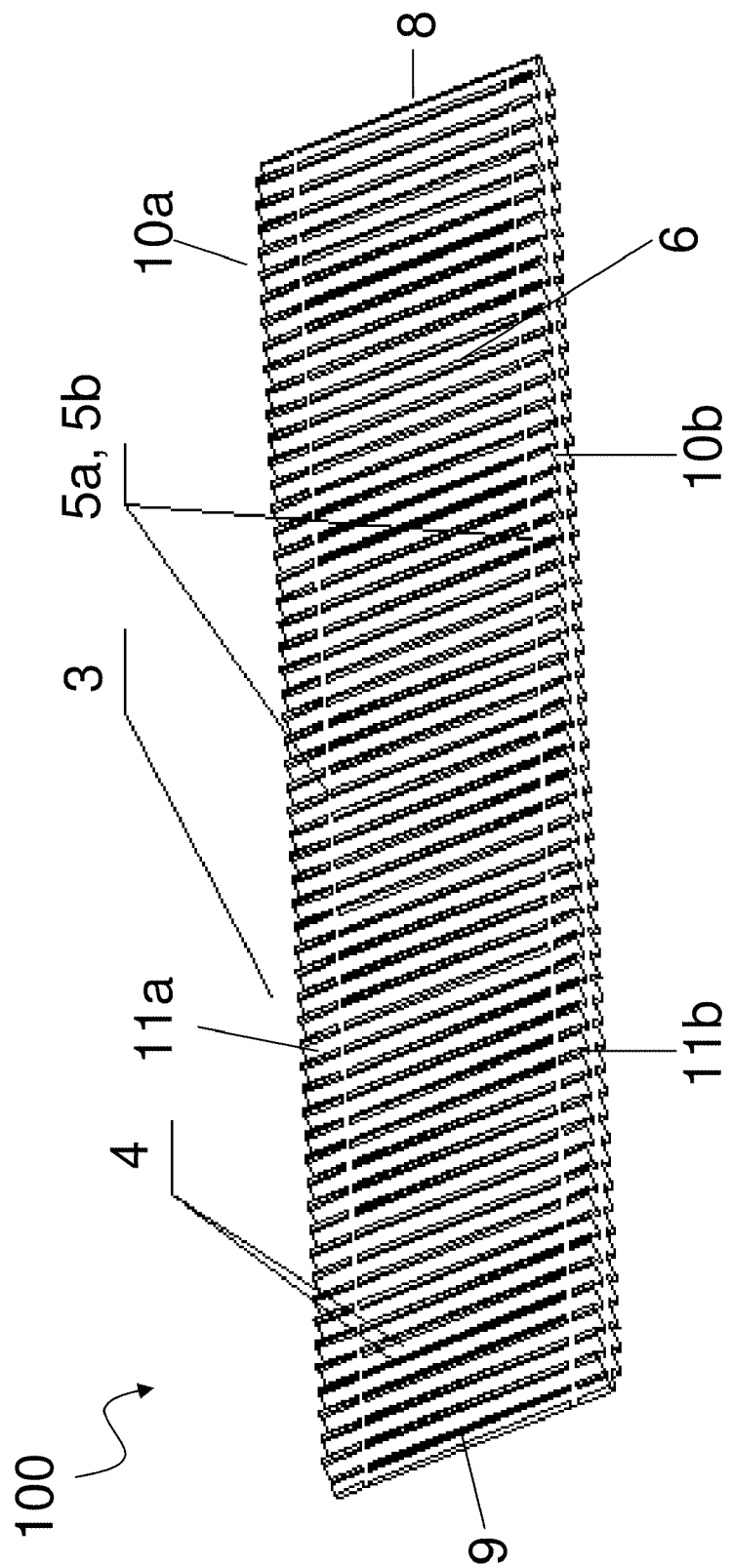
FIG. 1 is a perspective view of a floating bed, according to one embodiment.
Figure 2:
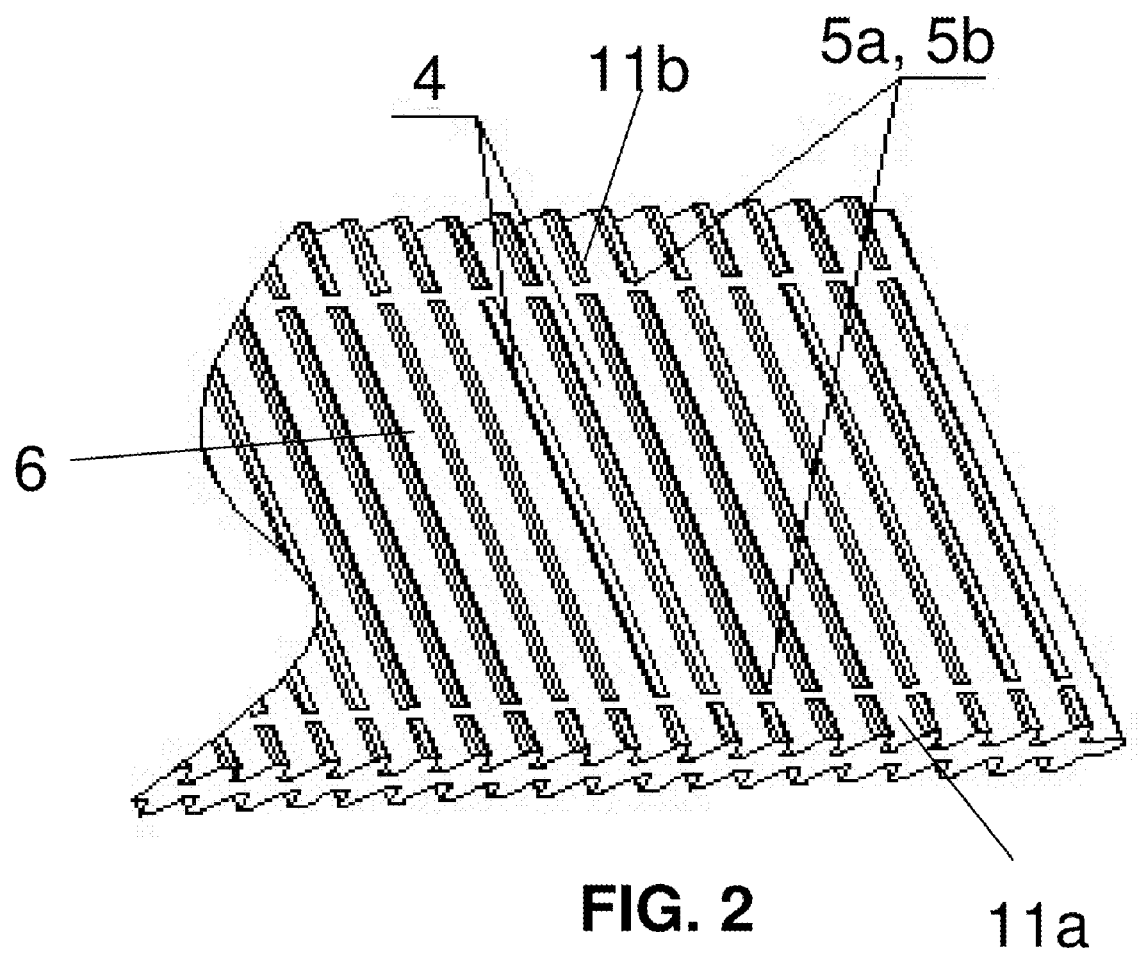
FIG. 2 is a close-up, partial view of one end of the floating bed pictured in FIG. 1.
Figure 3:
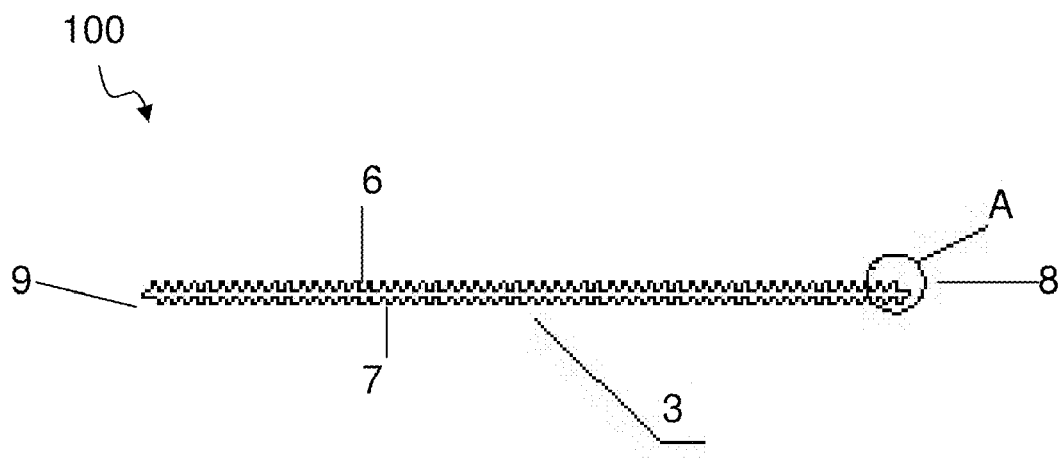
FIG. 3 is a side view of the floating bed pictured in FIGS. 1 and 2, according to one embodiment.
Figure 4:
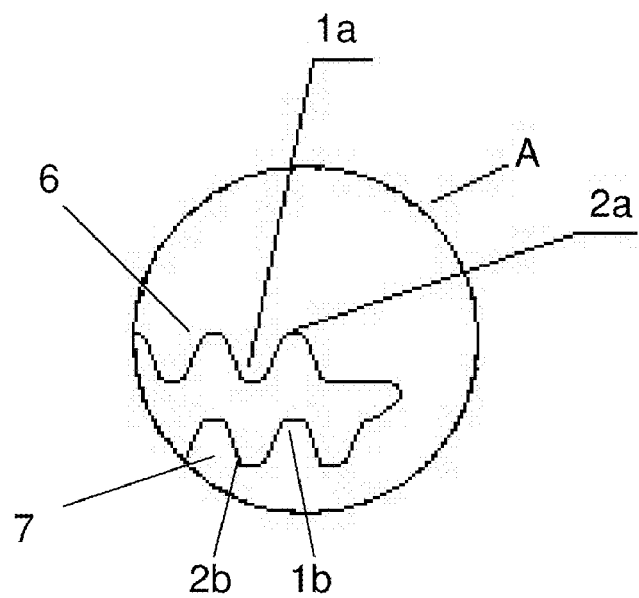
FIG. 4 is a close-up view of section A of FIG. 3.

The body 3 has a first surface 6 and a second surface 7, both having a plurality of transverse ridges 4. The transverse ridges 4 include both concave ridges 1a, 1b and convex ridges 2a, 2b that allow for water to channel underneath a user to continuously keep the user cool while in use. In one embodiment, the transverse ridges 4 are evenly distributed on the body 3. As shown in FIGS. 3 and 4, each concave ridge 1a on the first surface 6 corresponds to a convex ridge 2b on the second surface 7, and each convex ridge 2a on the first surface 6 corresponds to a concave ridge 1b on the second surface 7. This feature promotes comfort and makes it easy to roll up and store the floating bed 100. To prevent it from unrolling when a user wishes to store the bed, it may be stored in a bag, or, alternatively, one or more belts, straps, or other suitable securing elements for holding the floating bed in the rolled-up state may be used.

The body 3 has four edges including an upper edge 8, a lower edge 9, and two side edges 10a, 10b, and is substantially rectangular. In other embodiments, the body may have any shape that is practicable for use as a floating bed. The edges, as shown in the drawings, are optionally straight. In other embodiments, the edges may be curved, wavy, or otherwise shaped for aesthetic appeal or practical reasons. In one embodiment, the body 3 has dimensions of approximately 200×71×4 cm (70×27×1.75 in.) and can support a user that is over 200 pounds. In other embodiments, the dimensions may be larger or smaller based on the intended user. For example, a floating bed for a child may be substantially smaller than 200×71×4 cm, and a floating bed for a large adult may be substantially larger than 200×71×4 cm.

The floating bed may optionally have a first longitudinal seam 5a near the first side edge 10a, and a second longitudinal seam 5b near the second side edge 10b. The longitudinal seams 5a, 5b run lengthwise along the body 3 and perpendicular to the transverse ridges 4. When a user adjusts his or her position on the floating bed 100, the longitudinal seams 5a, 5b allow portions 11a, 11b of the bed between the longitudinal seams 5a, 5b and the side edges 10a, 10b to bend upward, providing increased balance for the user.

Figure 5:
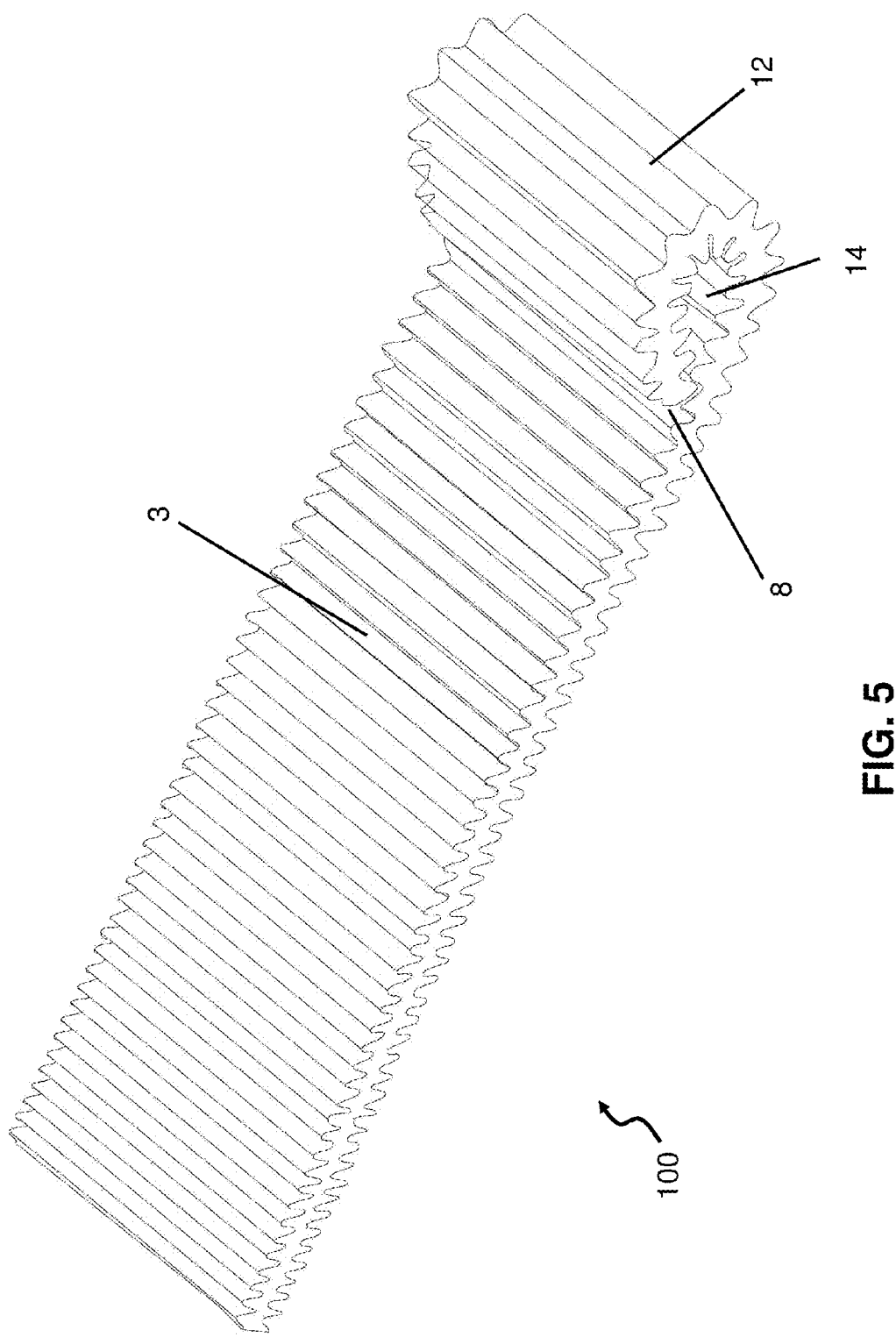
FIG. 5 is a perspective view of a floating bed with a headrest, according to one embodiment.

As shown in FIG. 5, according to one embodiment, the upper edge 8 of the body 3 of the floating bed 100 may optionally be folded or curled back and attached to the first surface 6 or the second surface 7 of the body 3 to form a headrest 12. The headrest 12 may be permanently attached to the body 3, or alternatively, may be removably attached to the body 3 using one or more fastening elements. The fastening elements may include, but are not limited to, pins, bolts, snaps, buckles, hooks-and-loops, clasps, or any other suitable elements. The fastening elements may optionally include corresponding male and female members.

Figure 6:
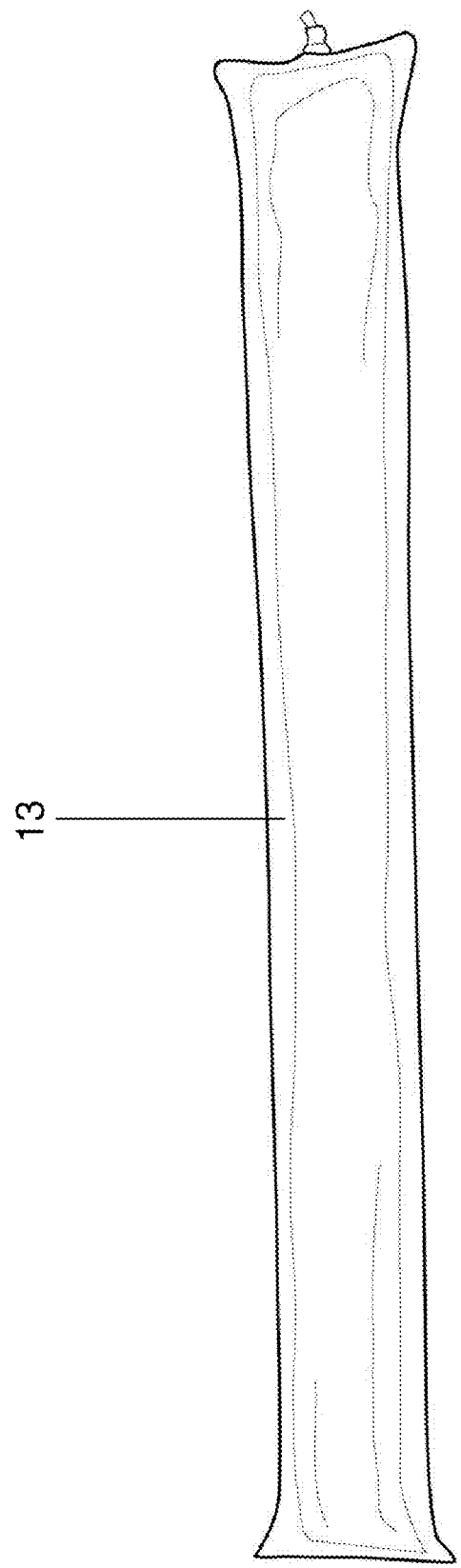
FIG. 6 is a top view of an inflatable tube that may be associated with a floating bed headrest, according to one embodiment.

As shown in FIG. 6, an inflatable tube 13 may be associated with the headrest 12 shown in FIG. 5. In one embodiment, the tube 13 may be inserted lengthwise into the space 14 created by the curled back upper edge 8. When inflated, the tube 13 supports the headrest 12 in its desired position. The tube 13 may optionally be attached to the body 3. In an alternative embodiment, an inflatable pillow may be provided that is permanently or removably attached to an area of the body 3 near the upper or lower edges 8, 9.

A floating bed as described herein may be constructed as follows. A sheet of foam or foam rubber is provided. As described above, the one or more foam or foam rubber materials may be PE, EVA, or other suitable materials.

The sheet may be heated in an oven or other device at a temperature that brings the foam or foam rubber materials to their deforming point so that the sheet takes on a soft, moldable state. For PE and EVA, such a temperature is preferably within the range of approximately 150° to 230° Celsius when the sheet is heated for approximately 2 to 7 minutes. The temperature and heating time may be selected based on the type of material and the thickness or density of the sheet.

For example, a thin sheet having a low density may be heated at a lower temperature and for a shorter time. Therefore, according to one embodiment, a thin sheet made of PE may be heated at a temperature of approximately 150° Celsius for approximately 2 minutes. A thicker sheet having a higher density could be heated at a higher temperature for a longer time. Therefore, according to another embodiment, a thick sheet made of PE may be heated at a temperature of 230° Celsius for approximately 7 minutes.

Generally, a sheet made of EVA should be heated at a higher temperature and for a longer time than a sheet of comparable thickness made of PE. Therefore, according to another embodiment, a thin sheet made of EVA, comparable in thickness to a thin sheet of PE, may be heated at a temperature of approximately 190° Celsius for approximately 5 minutes. Other suitable temperatures and heating times may be used to bring the sheet into a soft, moldable state.

Optionally, the density and buoyancy of the heated sheet may be modified by adjusting the thickness of the floating bed. The heated sheet is then placed in a press mold that has transverse convex and concave projections that create the transverse concave and convex ridges on each surface of the floating bed. The press mold is preferably compressed for approximately 3-5 minutes to form the transverse ridges of the floating bed body.

The floating bed body is then removed from the press mold in a substantially finished state. Some excess material resulting from the compression step, however, may need to be removed or trimmed from the edges. While the formation of a headrest 12, creation of longitudinal seams 5a, 5b, and other optional embodiments of the floating bed may be added to the steps of the method described herein, a fully functional and self-contained floating bed may be manufactured by the steps provided above. This short and relatively easy process generally reduces costs and can be used in high yield production.

Any of the above-described embodiments may be used alone or in combination with one another. Furthermore, the floating bed may include additional features not described herein. While several embodiments have been shown and described, various changes and substitutions may of course be made, without departing from the spirit and scope of the invention. The invention, therefore, should not be limited, except by the following claims and their equivalents.

What is claimed is:

1. A floating bed, comprising:
    a body comprising a single piece of foam material or a foam rubber material, wherein the foam material is polyethylene (PE) or ethylene vinyl acetate (EVA), with the body comprising:
    a first surface having a plurality of transverse concave and convex ridges; and
    a second surface, opposite the first surface, having a plurality of transverse concave and convex ridges, wherein the transverse convex and concave ridges are substantially evenly distributed, and wherein:
        (i) each concave ridge on the first surface corresponds to a convex ridge on the second surface; and
        (ii) each convex ridge on the first surface corresponds to a concave ridge on the second surface; and
    a first longitudinal seam adjacent to a first side edge and a second longitudinal seam adjacent to a second side edge, each longitudinal seam running lengthwise along the body and perpendicular to the transverse concave and convex ridges.

2. The floating bed of claim 1, wherein the floating bed includes an upper edge and a lower edge.

3. The floating bed of claim 2, wherein the upper edge is foldable and attachable to the first or second surface of the body to form a headrest.

4. The floating bed of claim 3, wherein the upper edge is permanently attached to the first or second surface of the body.

5. The floating bed of claim 3, wherein the upper edge is removably attached to the first or second surface of the body via one or more fastening elements.

6. The floating bed of claim 3, further comprising an inflatable tube within the headrest to provide support for the headrest.

7. The floating bed of claim 2, wherein an inflatable pillow is removably attached to the body near the upper or lower edge.

8. A method for making a floating bed body comprising:
    providing a sheet made of polyethylene (PE) or ethylene vinyl acetate (EVA) and having a first surface and an opposing second surface;
    heating the sheet at a temperature that brings the foam or foam rubber material its deforming point;
    adjusting the thickness of the heated sheet to modify its buoyancy;
    placing the heated sheet in a press mold having transverse convex and concave projections;
    compressing the press mold to form a plurality of transverse concave and convex ridges in each of the first and second surfaces to form a floating bed, wherein the transverse convex and concave ridges are substantially evenly distributed, and wherein:

(i) each concave ridge on the first surface corresponds to a convex ridge on the second surface; and
(ii) each convex ridge on the first surface corresponds to a concave ridge on the second surface; and removing the pressed floating bed body from the press mold.

9. The method of claim 8, wherein the sheet is heated at a temperature of approximately 150-230 degrees Celsius.

10. The method of claim 9, wherein the sheet is heated for a time of approximately 3-7 minutes.

11. The method of claim 8, further comprising cutting the sheet to a size of approximately 200×71×4 cm before heating the sheet.

12. The method of claim 8, further comprising trimming the edges of the pressed floating bed body after removing the bed body from the press mold.

13. A floating bed, comprising:
a body comprising a single piece of foam material or a foam rubber material, with the body comprising:
a first surface having a plurality of transverse concave and convex ridges; and
a second surface, opposite the first surface, having a plurality of transverse concave and convex ridges, wherein the transverse convex and concave ridges are substantially evenly distributed, and wherein:
(i) each concave ridge on the first surface corresponds to a convex ridge on the second surface; and
(ii) each convex ridge on the first surface corresponds to a concave ridge on the second surface;
a first longitudinal seam adjacent to a first side edge and a second longitudinal seam adjacent to a second side edge, each longitudinal seam running lengthwise along the body and perpendicular to the transverse concave and convex ridges; and
an upper edge and a lower edge, wherein the upper edge is permanently attached to the first or second surface of the body to form a headrest.

* * * * *